(12) United States Patent
Barnes

(10) Patent No.: US 12,543,146 B2
(45) Date of Patent: Feb. 3, 2026

(54) GEOLOCATION OF DIGITAL WIRELESS SIGNALS VIA REMODULATED SIDE-CHANNEL

(71) Applicant: L3Harris Technologies, Inc., Melbourne, FL (US)

(72) Inventor: Jeffrey D. Barnes, Dallas, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 383 days.

(21) Appl. No.: 18/451,407

(22) Filed: Aug. 17, 2023

(65) Prior Publication Data

US 2025/0063543 A1    Feb. 20, 2025

(51) Int. Cl.
*H04W 64/00* (2009.01)
*G01S 3/04* (2006.01)

(52) U.S. Cl.
CPC ........... *H04W 64/006* (2013.01); *G01S 3/043* (2013.01)

(58) Field of Classification Search
CPC ... G01S 5/06; G01S 3/043; G01S 3/48; G01S 3/74; G01S 5/04; G01S 3/46; G01S 3/14; G01S 5/02213; G01S 5/0221; G01S 3/8083; G01S 5/12; H04B 7/0802; H04B 7/0871; H04W 64/006
See application file for complete search history.

(56) References Cited

U.S. PATENT DOCUMENTS

| | | | |
|---|---|---|---|
| 7,778,651 | B2 | 8/2010 | Billhartz |
| 9,651,652 | B2 | 5/2017 | Kpodzo et al. |
| 10,142,778 | B2 | 11/2018 | Banerjea |
| 10,206,122 | B2 | 2/2019 | Wang et al. |
| 2010/0220011 | A1 | 9/2010 | Heuser |
| 2015/0355312 | A1 | 12/2015 | Aymes et al. |

(Continued)

FOREIGN PATENT DOCUMENTS

WO    WO-2018078119 A1 *    5/2018    ........... H04L 25/022

OTHER PUBLICATIONS

Mohammad H. Haroun, et al., "Direction of Arrival Estimation for LTE-Advanced and 5G in the Uplink", 2018 IEEE Middle East and North Africa Communications Conference (MENACOMM), 6 pages.

(Continued)

*Primary Examiner* — Olumide Ajibade Akonai
(74) *Attorney, Agent, or Firm* — Edell, Shapiro & Finnan, LLC

(57) ABSTRACT

A method comprises: by a DF antenna array, receiving a modulated RF signal and converting the modulated RF signal to multiple modulated RF channels; converting the multiple modulated RF channels to multiple channels of in-phase (I) and quadrature (Q) (I/Q) data; by a side-channel antenna, converting the modulated RF signal to a modulated RF side-channel; converting the modulated RF side-channel to a side-channel of I/Q data; demodulating and decoding the side-channel of the I/Q data to yield demodulated data; remodulating the demodulated data to produce remodulated reference I/Q data; correlating the remodulated reference I/Q data against the multiple channels of the I/Q data to produce correlation results for the multiple channels of the I/Q data; and determining an angle-of-arrival of the modulated RF signal to the DF antenna array based on the correlation results.

20 Claims, 6 Drawing Sheets

(56) References Cited

U.S. PATENT DOCUMENTS

2019/0137596 A1\* 5/2019 Silverman .................. G01S 5/06
2021/0302528 A1\* 9/2021 Wang ......................... G01S 3/46
2022/0268911 A1\* 8/2022 Wu .......................... G01S 7/356

OTHER PUBLICATIONS

Alejandro Gil-Martínez, et al., "Wi-Fi Direction Finding With Frequency-Scanned Antenna and Channel-Hopping Scheme", IEEE Sensors Journal, vol. 22, No. 6, Mar. 15, 2022, 13 pages.
Extended European Search Report in corresponding European Application No. 24193164.1, dated Jan. 31, 2025, 10 pages.
Marcin K. Baczyk, et al., "Reconstruction of the Reference Signal in DVB-T-based Passive Radar", Intl. Journal of Electronics and Telecommunications, 2011, vol. 57, No. 1, 6 pages.
Bruno Demissie, "Clutter cancellation in passive radar using GSM broadcast channels". IET Radar, Sonar and Navigation, 2014, vol. 8, Iss. 7, 10 pages.

\* cited by examiner

GEOLOCATION OF DIGITAL WIRELESS SIGNALS VIA REMODULATED SIDE-CHANNEL

TECHNICAL FIELD

The present disclosure relates generally to direction finding.

BACKGROUND

A location system may produce geolocation measurements on an emitter-of-interest based on a wireless signal transmitted by the emitter. For example, a direction finding (DF) system utilizes an array of antenna elements along with signal collection and processing to obtain lines of bearing (LOBs) and subsequent geolocation estimates on the emitter based on receipt of the wireless signal by the DF system. A conventional DF system may fail to provide meaningful location measurements on the emitter for several reasons. First, the received signal power for the wireless signal transmitted by the emitter may fall below a detection threshold due to a long range between the DF system and the emitter (and thus a high free-space path loss between the two) or due to insufficient antenna gain. Second, a dense radio frequency (RF) interference environment may inhibit proper parameter estimation on the wireless signal transmitted by the emitter. Third, the DF system may be unable to use knowledge of an underlying signal structure or content of the wireless signal in order to produce geolocation measurements.

DESCRIPTION

Overview

In an embodiment, a method comprises: by a DF antenna array, receiving a modulated RF signal and converting the modulated RF signal to multiple modulated RF channels; converting the multiple modulated RF channels to multiple channels of in-phase (I) and quadrature (Q) (I/Q) data; by a side-channel antenna, converting the modulated RF signal to a modulated RF side-channel; converting the modulated RF side-channel to a side-channel of I/Q data; demodulating and decoding the side-channel of the I/Q data to yield demodulated data; remodulating the demodulated data to produce remodulated reference I/Q data; correlating the remodulated reference I/Q data against the multiple channels of the I/Q data to produce correlation results for the multiple channels of the I/Q data; and determining an angle-of-arrival of the modulated RF signal to the DF antenna array based on the correlation results.

EXAMPLE EMBODIMENTS

According to an embodiments presented herein, a direction finding (DF) system uses a side-channel to receive, detect, decode, and then remodulate a wireless signal received by the side-channel, to produce a remodulated reference that aids in determining a line-of-bearing (LOB) to an emitter of the wireless signal. The side-channel and associated signal processing may be co-located with a DF processor on a platform, or may reside on a separate platform. The side-channel may be fed from either a steerable beam antenna, which provides interference mitigation to enable demodulation and decoding of the wireless signal, or an omnidirectional antenna.

The process of generating the remodulated reference may be specific to the wireless signal and the emitter and can be developed for many different types of wireless signals and emitters. The remodulated reference is generated from a demodulated, decoded, and verified version of the wireless signal and thus represents a reduced-noise version of the wireless signal. The remodulated reference provides DF correlation gain at the DF processor, resulting in viable steering vectors used for LOB generation. For example, the remodulated reference can provide up to 40 dB or more of correlation gain, enabling geolocation of the emitter that previously was difficult or impossible with a conventional DF system. Moreover, the wireless signal, once decoded, may carry uniquely identifying information for the emitter, which can be paired with the resulting LOBs and geolocations. Further advantages and other features of the embodiments will become apparent from the ensuing description.

Figure 1:
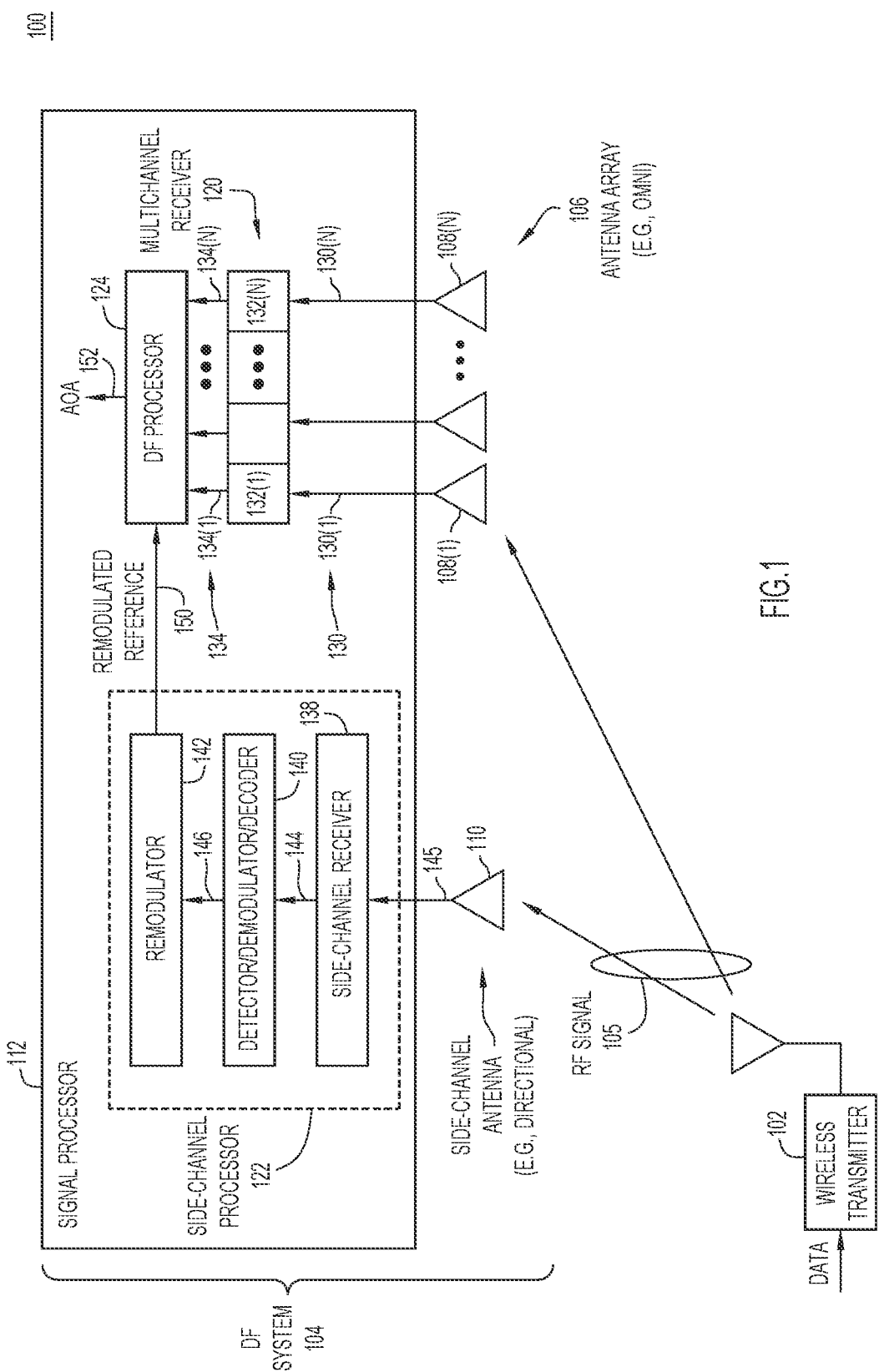
FIG. 1 is an illustration of an example communication environment that includes a wireless transmitter and a direction finding (DF) system configured for direction finding according to an embodiment.

FIG. 1 is an illustration of an example communication environment 100 that includes a wireless transmitter 102 (also referred to as an "emitter") and a DF system 104 spaced-apart from the wireless transmitter and configured to perform direction finding according to embodiments presented herein. Wireless transmitter 102 receives and packetizes a data stream to produce data in the form of data packets. Wireless transmitter 102 typically adds to the data wireless transmitter identifiers, such as an Internet Protocol (IP) address, a media access control (MAC) address, and other identifiers, for example. Wireless transmitter 102 encodes the data and adds a checksum and/or a cyclic redundancy check (CRC) to the data to produce encoded data, which may be formatted as an encoded data packet. Wireless transmitter 102 digitally modulates the encoded data to produce digitally modulated data, which may be packetized into digitally modulated data packets. Wireless transmitter 102 may digitally modulate the data using any known or hereafter developed digital modulation technique, including but not limited to, frequency-division multiplexing (OFDM), direct sequence (DS) spread spectrum (DSSS), quadrature amplitude modulation (QAM), phase-shift keying (PSK), and the like.

Wireless transmitter 102 may add a preamble to the digitally modulated data. For example, wireless transmitter 102 may prepend the preamble to the digitally modulated packets. Wireless transmitter 102 frequency up-coverts the digitally modulated data with the preambles to a (digitally) modulated RF signal, and transmits the same as modulated RF signal 105. Modulated RF signal 105 conveys the digitally modulated data, which may be packetized. In some example, wireless transmitter 102 may be a relatively low power transmitter that transmits modulated RF signal 105 at a relatively low power level. Examples of wireless transmitter 102 may include a Wi-Fi, Bluetooth, or cellular user-equipment (UE) transmitter (e.g., for a Universal Mobile Telecommunication Service (UMTS), Long-Term Evolution (LTE), 5G-New Radio (NR), and the like).

DF system 104 may be hosted on an airborne platform, such as an airplane or the like, or may be hosted on a ground-based platform. DF system 104 receives modulated RF signal 105 and performs direction finding based on the modulated RF signal as received to determine an angle-of-arrival (AOA) at which the modulated RF signal arrives at the DF system, and thus the LOB from the DF system to wireless transmitter 102. DF system 104 is now described in further detail. DF system 104 includes an antenna array 106 (also referred to as a "DF antenna array") configured with multiple antennas 108(1)-108(N) arranged in a known geometry, a side-channel antenna 110, and a signal processor 112. Antenna array 106 may be configured as a relatively low-gain omnidirectional antenna array, while side-channel antenna 110 may be configured as a relatively high-gain directional antenna with a main gain lobe pointed in a particular direction. In the example, side-channel antenna 110 is not part of antenna array 106.

Signal processor 112 includes multichannel receiver 120 fed by antenna array 106, a side-channel processor 122 fed by side-channel antenna 110, and a DF processor 124 concurrently fed by the multichannel receiver and the side-channel processor. Multiple antennas 108(1)-108(N) of antenna array 106 receive RF energy impinging on the antenna array. The RF energy includes modulated RF signal 105 transmitted by wireless transmitter 102 and may also include undesired RF noise and interference. Multiple antennas 108(1)-108(N) covert the received RF energy, including modulated RF signal 105, to multiple RF channels or feeds 130(1)-130(N) (collectively referred to as multiple "RF feeds 130") of received RF representative of the received RF energy, and supply the RF feeds to respective inputs of channelized receivers 132(1)-132(N) of multichannel receiver 120, in parallel. Given the low omnidirectional gain of antenna array 106, each of multiple RF feeds 130(i) may represent modulated RF signal 105 with a relatively low signal-to-noise ratio (SNR).

Channelized receivers 132(1)-132(N) (which may each be a single channel receiver, for example) are tuned to a center frequency of modulated RF signal 105 and respectively frequency down-convert multiple RF feeds 130(1)-130(N) to multiple channels of I/Q data 134(1)-134(N) (collectively referred to as "multiple channels of I/Q data 134") without detecting, digitally demodulating, and decoding the digitally modulated data conveyed in the multiple RF feeds. Channelized receivers 132(1)-132(N) provide multiple channels of I/Q data 134(1)-134(N) to DF processor 124, in parallel. Multiple channels of I/Q data 134(also referred to as "multiple I/Q channels") of convey/represent the digitally modulated data with preambles generated and transmitted by wireless transmitter 102, as described above. The digitally modulated data may be represented in each of multiple channels of I/Q data 134(i) with a relatively low SNR given the undesired noise and interference also conveyed in each of the multiple channels of I/Q data 134(i).

Side-channel processor 122 includes a side-channel receiver 138 (e.g., a single-channel receiver) fed by side-channel antenna 110, a detector/demodulator/decoder 140, and a remodulator 142. Side-channel antenna 110 receives the RF energy, including modulated RF signal 105, concurrently with antenna array 106. Side-channel antenna 110 converts the received RF including modulated RF signal 105 to an RF side-channel feed 145, and supplies the RF side-channel feed to an input of side-channel receiver 138. Assuming side-channel antenna 110 generally points toward wireless transmitter 102 (i.e., the main gain lobe of the side-channel antenna is generally aligned with the wireless transmitter), the higher selectivity of the side-channel antenna compared to that of antenna array 106 (when the antenna array is omnidirectional) produces RF side-channel feed 145 with a higher signal-to-noise (SNR) with respect to modulated RF signal 105 compared to that of each multiple RF feed 130(i).

Side-channel receiver 138 converts RF side-channel feed 145 to a side-channel of I/Q data 144 (also referred to as an I/Q side-channel), and provides the same to detector/demodulator/decoder 140. Side-channel of I/Q data 144 represents the digitally modulated data with preambles that is generated and transmitted by wireless transmitter 102, as described above. The digitally modulated data conveyed by side-channel of I/Q data 144 may have a higher SNR than the digitally modulated data conveyed by each of multiple channels of I/Q data 134. In an alternative arrangement, side-channel receiver 138 may be implemented as a channelized receiver of multichannel receiver 120, e.g., as a channelized receiver 132(N+1) of the multichannel receiver.

Detector/demodulator/decoder 140 performs the following sequence of receiver/signal processing operations on the (received) digitally modulated data with preambles (e.g., on each of the digitally modulate data packets with preambles) of side-channel of I/Q data 144:

a. Detect the digitally modulated data (or packetized data) based on the preamble. For example, correlate the side-channel of I/Q data 144 against a predetermined preamble that matches the preamble prepended to digitally modulated data in order to detect the digitally modulated data, and identify a start of the digitally modulated data (e.g., the start of a digitally modulated data packet). In some examples, the detection operation may be optional and may be skipped.
  b. Once detected, digitally demodulate the digitally modulated data to yield or produce demodulated data that includes the encoded data with the checksum and/or CRC.
  c. Decode the encoded data and verify the checksum and/or CRC to produce data (e.g., a data packet) that is verified. Parse the data to accesses the wireless transmitter identifiers.

An advantage of detecting, demodulating, and decoding side-channel I/Q data 144 is that the side-channel I/Q data may have a relatively high SNR, which increases the likelihood of recovering accurate data from the process. Detector/demodulator/decoder 140 sends to remodulator 142 combined data 146 including a stream of demodulated, decoded, and verified data (e.g., data packets) along with the wireless transmitter identifiers. Employing the same digital modulation technique used by wireless transmitter 102 to produce modulated RF signal 105 (e.g., OFDM, DSSS, QAM, PSK, and the like), remodulator 142 digitally modulates (i.e., remodulates) the data supplied by detector/demodulator/decoder 140, to produce a stream or channel of remodulated reference I/Q data 150, and provides the same to DF processor 124. Remodulated reference I/Q data 150 represents denoised and verified digitally modulated I/Q data that serves as a clean reference for subsequent processing. That is, Remodulated reference I/Q data 150 provides a denoised representation of modulated RF signal 105. Remodulator 142 associates the transmitter identifiers to remodulated reference I/Q data 150 as metadata, and provides both the remodulated reference I/Q data and the metadata to DF processor 124.

DF processor 124 concurrently receives the stream of remodulated reference I/Q data 150 and multiple channels of I/Q data 134. DF processor 124 determines an AOA 152 of modulated RF signal 105 relative to antenna array 106 based on remodulated reference I/Q data 150 and multiple channels of I/Q data 134. More specifically, DF processor 124 correlates remodulated reference I/Q data 150 against each of multiple channels of I/Q data 134 to produce correlation results, and determines AOA 152 based on the correlation results. The correlation process is described below in connection with FIG. 3.

Figure 2:
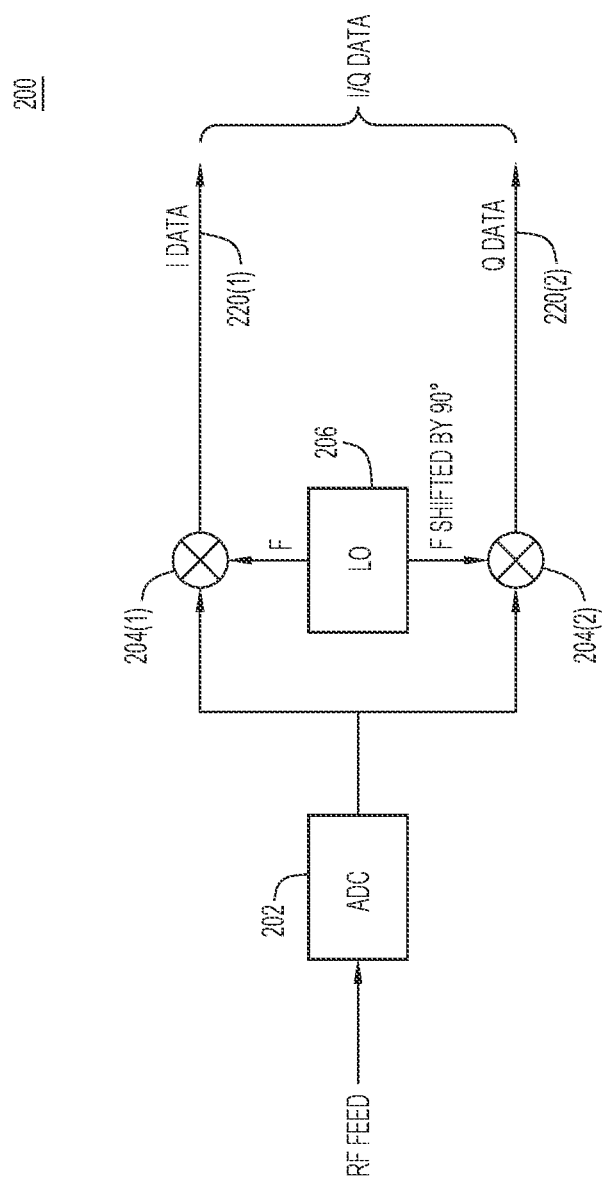
FIG. 2 is a block diagram of an example channel receiver used in the DF platform to produce channel in-phase (I) and quadrature (Q) (I/Q) data from an RF feed provided by an antenna.

FIG. 2 is a block diagram of a channel receiver 200 representative of side-channel receiver 138 or each channelized receiver 132(i). Channel receiver 200 includes an analog-to-digital converter (ADC) 202, an in-phase mixer 204(1), a quadrature mixer 204(2), and a local oscillator (LO) 206. In the example, in-phase mixer 204(1), quadrature mixer 204(2), and LO 206 all operate in the digital domain. ADC 202 receives an RF feed (e.g., RF feed 130(i) or RF side-channel feed 145), digitizes the RF feed (e.g., the modulated RF signal) to produce a digitized RF signal, and provides the same in parallel to in-phase mixer 204(1) and quadrature mixer 204(2). LO 206 generates an in-phase LO frequency F and provides the same to in-phase mixer 204(1). LO 206 includes a 90° phase shifter (not shown) to generate a quadrature LO signal that is shifted in phase from the in-phase LO signal by 90°, and provides the quadrature LO signal (F−90°) to mixer 204(2).

Mixer 204(1) frequency down-converts the digitized RF signal to digitized baseband in-phase (I) data 220(1) based on in-band LO signal. Similarly, mixer 204(1) frequency down-converts the digitized RF signal to digitized baseband quadrature (Q) data 220(2) based on the quadrature LO frequency. In-phase data 220(1) and quadrature data 220(2) together represent digitized baseband I/Q data for the given channel. In an alternative example in which in-phase mixer 204(1), quadrature mixer 204(2), and LO 206 all operate in the analog domain, ADC 202 is replaced by parallel ADCs in-line with the outputs of in-phase mixer 204(1) and quadrature mixer 204(2).

Figure 3:
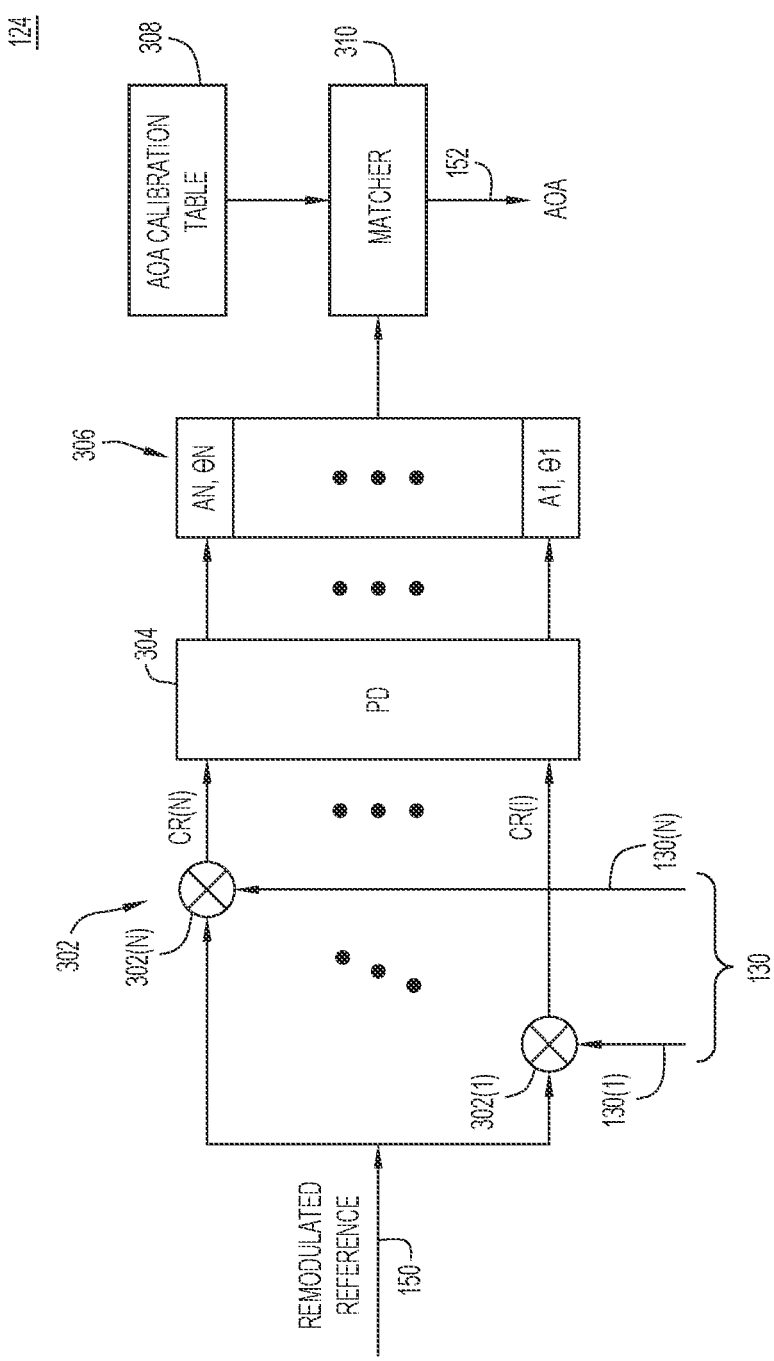
FIG. 3 is a block diagram of an example DF processor of the DF platform.

FIG. 3 is a block diagram of DF processor 124 according to an embodiment. DF processor 124 includes correlators 302(1)-302(N) (collectively referred to as correlators 302), a peak detector (PD) 304 that produces a steering vector 306, an AOA calibration database 308, and a matcher 310. Correlators 302(1)-302(N) individually/separately correlate remodulated reference I/Q data 150 from remodulator 142 against multiple channels of I/Q data 134(1)-134(N) to produce correlation results CR(1)-CR(N) for the multiple channels, respectively. Peak detector 304 detects correlation peaks in correlation results CR(1)-CR(N) and populates steering vector 306 with tuples (magnitude A, phase θ) corresponding to the correlation peaks respectively. Peak detector 304 forwards steering vector 306 to matcher 310.

AOA calibration database 308 stores predetermined signal magnitudes and predetermined phases from multiple antennas 108(1)-108(N) for a range of different predetermined AOAs, as is known. Matcher 310 implements a known or hereafter developed DF algorithm. In an example, matcher 310 searches AOA calibration database 308 for a set of the predetermined signal magnitudes and predetermined phases that match steering vector 306 within a predetermined tolerance. Matcher 310 identifies a predetermined AOA associated with the set of the predetermined signal magnitudes and predetermined phases that match steering vector 306. This AOA (152) represents the AOA of modulated RF signal 105 relative to antenna array 106. The process translates the AOA to a corresponding LOB.

Figure 4:
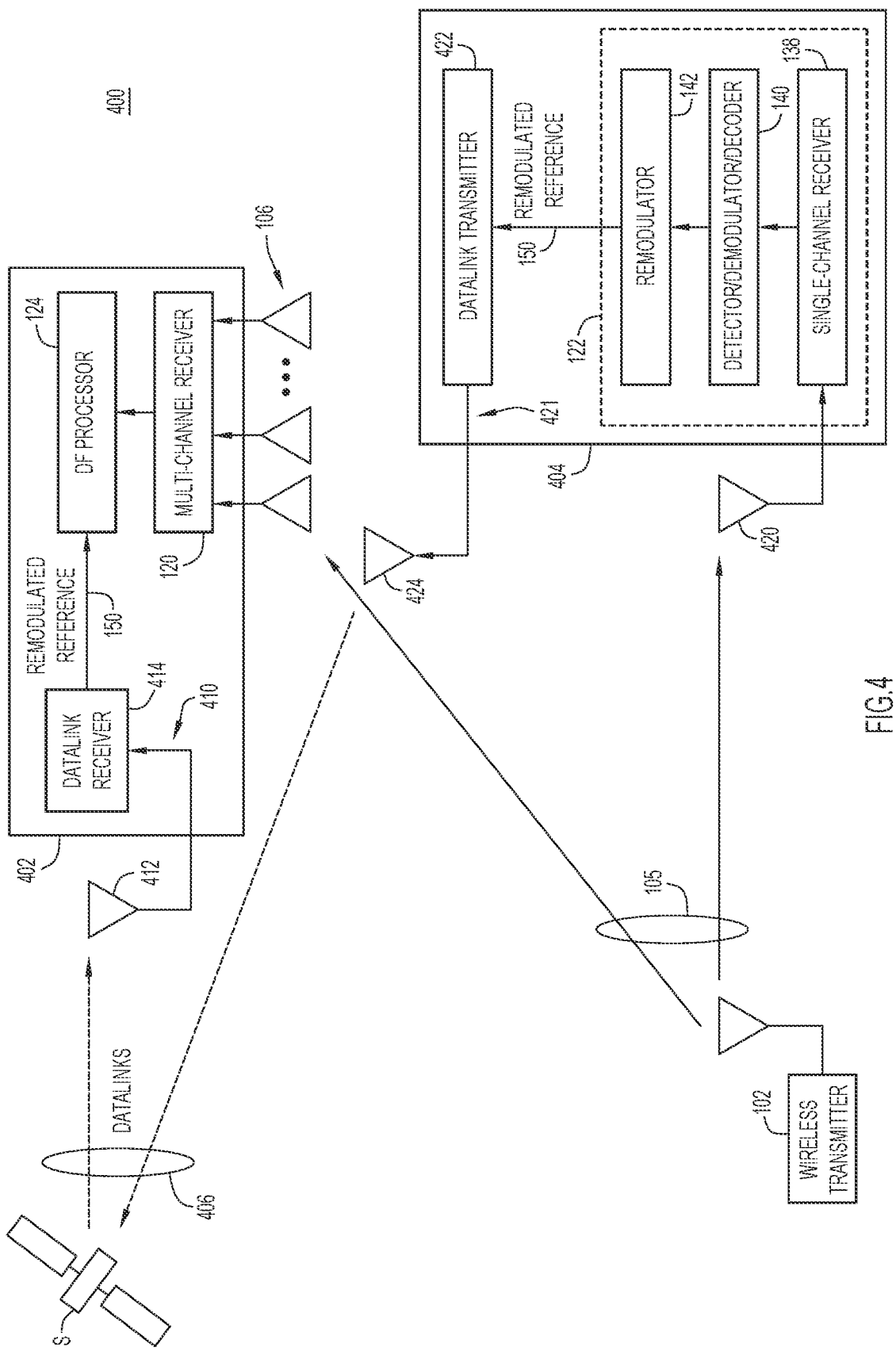
FIG. 4 is an illustration of an example communication environment that employs a divided DF system on multiple platforms.

FIG. 4 is an illustration of an example communication environment 400 that employs a divided DF system having a DF platform 402 and a DF platform 404 that cooperate with each other to perform direction finding. The embodiment of FIG. 4 essentially divides DF system 104 of FIG. 1 across DF platform 402 and DF platform 404. DF platform 402 may be an airborne platform spaced-apart from wireless transmitter 102 by a first distance. DF platform 404 may be airborne or ground-based and is spaced-apart from wireless transmitter 102 by a second distance that is less than the first distance. That is, DF platform 404 may be positioned closer to wireless transmitter 102 than DF platform 402. DF platform 402 and DF platform 404 communicate with each other over datalinks 406 relayed through a communication satellite S, for example. In other examples, datalinks 406 may be relayed through a ground-based repeater.

Similar to DF system 104, DF platform 402 includes antenna array 106, multichannel receiver 120, and DF processor 124, which operate as described above; however, DF platform 402 replaces side-channel antenna 110 and side-channel processor 122 with a datalink receiver subsystem 410 that includes a datalink antenna 412 and a datalink receiver 414, which is connected to DF processor 124.

Similar to DF system 104, DF platform 404 includes a side-channel antenna 420 that feeds side-channel processor 122 with RF energy received by the side-channel antenna. In an arrangement in which DF platform 404 is sufficiently close to wireless transmitter 102 to ensure that modulated RF signal 105 has a high signal strength at DF platform 404, side-channel antenna 420 may be omnidirectional instead of directional. As described above, side-channel antenna 420 delivers modulated RF signal to side-channel processor 122, and the side-channel processor derives remodulated reference I/Q data 150.

DF platform 404 further includes a datalink transmitter subsystem 421 that includes a datalink transmitter 422 connected to remodulator 142, and a datalink antenna 424 connected to the datalink transmitter. Datalink transmitter subsystem 421 wirelessly transmits remodulated reference I/Q data 150 (along with the metadata) from DF platform 404 to DF platform 402 as a wireless datalink signal over datalinks 406. At DF platform 402, datalink receiver subsystem 410 receives the wireless datalink signal, recovers remodulated reference I/Q data 150 and the metadata from the wireless datalink signal, and provides the recovered information to DF processor 124.

Figure 5:
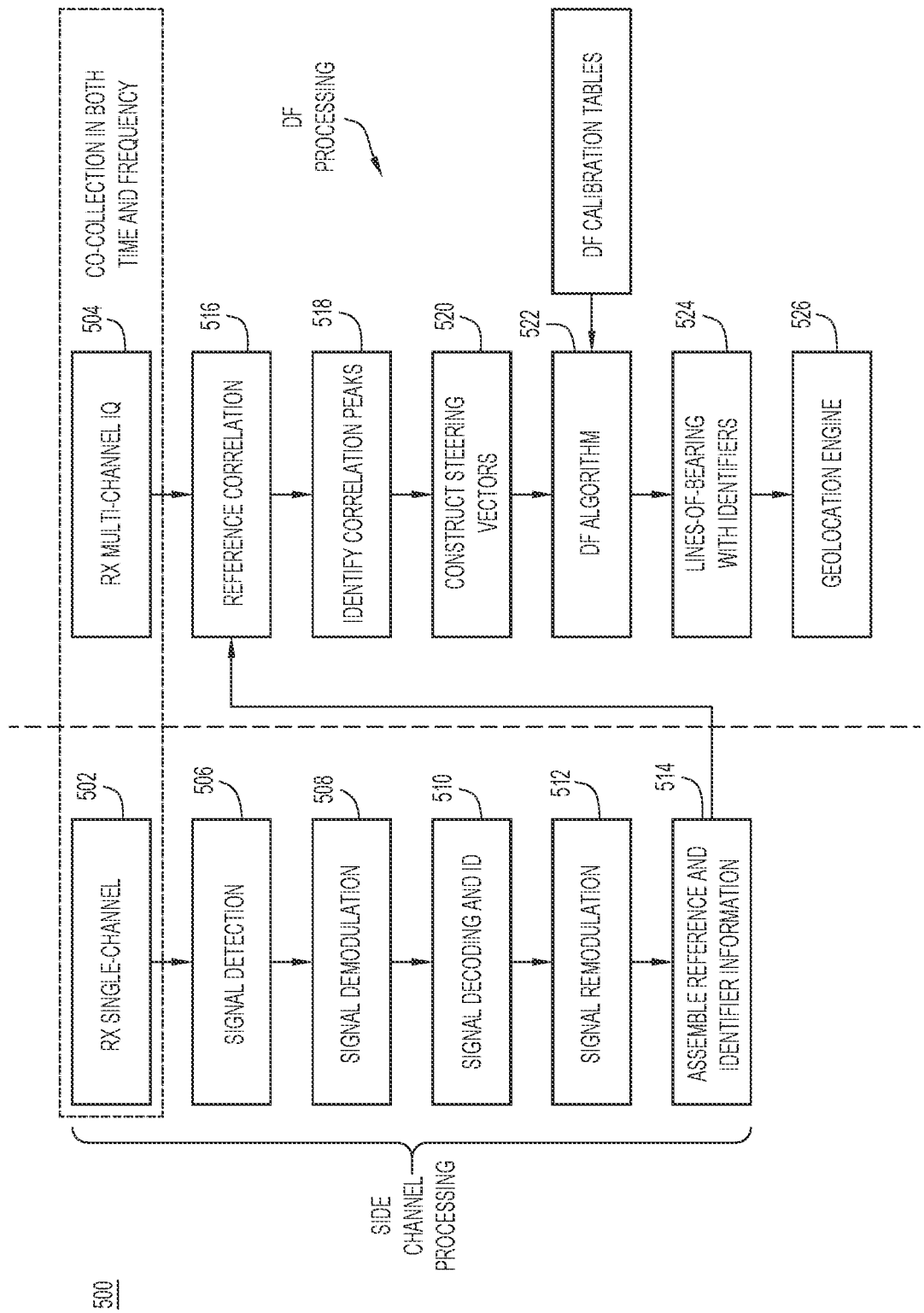
FIG. 5 is a flowchart of an example method of direction finding performed by the DF systems of FIGS. 1 and 4.

FIG. 5 is a flowchart of an example method 500 of direction finding performed by the systems of FIGS. 1 and 4 based on modulated RF signal 105 transmitted by wireless transmitter 102.

Method 500 performs concurrent RF energy collection and conversion operations 502 and 504 to deliver I/Q data to subsequent operations. Specifically, at 502, side-channel antenna 110 (or side-channel antenna 420) receives modulated RF signal 105 and converts the same to an RF side-channel feed. Modulated RF signal 105 conveys digitally modulated encoded data. Side-channel receiver 138 converts the RF side-channel feed to a side-channel of (modulated) I/Q data (e.g., digitized baseband I/Q data), which also conveys the digitally modulated encoded data. In other words, the I/Q data is not demodulated. Concurrently, at 504, antenna array 106 receives modulated RF signal 105 and converts the same to multiple modulated RF feeds. Multichannel receiver 120 converts the multiple RF feeds to multiple channels of (modulated) I/Q data (e.g., digitized baseband I/Q data), which convey the digitally modulated encoded data. In this example, the multichannel I/Q data is not demodulated.

At 506, detector/demodulator/decoder 140 detects the digitally modulated encoded data conveyed by the side-channel of I/Q data, to produce detected digitally modulated encoded data.

At 508, detector/demodulator/decoder 140 digitally demodulates the detected digitally modulated encoded data from 506, to produce or recover (demodulated) encoded data.

At 510, detector/demodulator/decoder 140 decodes the encoded data to produce data (i.e., demodulated data) and recovers transmitter identifiers (IDs) from the data. The decoding process verifies that the (demodulated) data is correct using a cyclic redundancy check (CRC), for example.

At 512, remodulator 142 digitally modulates the data from 510 to produce remodulated reference I/Q data.

At 514, remodulator 142 assembles together the remodulated reference I/Q data with metadata that includes the transmitter identifiers.

DF processor 124 determines the AOA according the following operations.

At 516, DF processor 124 correlates the remodulated reference I/Q data against each of the multiple channels of I/Q data to produce correlation results for the multiple channels of I/Q data.

At 518, DF processor 124 detects/identifies correlation peaks in the correlation results for the multiple channels of the I/Q data.

At 520, DF processor 124 generates or constructs steering vectors populated with magnitudes and phases of the correlation peaks.

At 522, DF processor 124 accesses predetermined received signal magnitude and phase information that is mapped to predetermined AOAs for antenna array 106 from DF calibration tables. DF processor 124 performs a DF algorithm that matches the steering vectors from 520 to the predetermined information, to determine an AOA of modulated RF signal 105 (from wireless transmitter 102) at antenna array 106. The AOA provides a LOB from antenna array 106 to wireless transmitter 102.

At 524, DF processor 124 associates or pairs LOBs with the transmitter identifiers and provides the same to a geolocation engine.

At 526, the geolocation engine performs further location processing based on the LOBs and the transmitter identifiers, to locate wireless transmitter 102.

Figure 6:
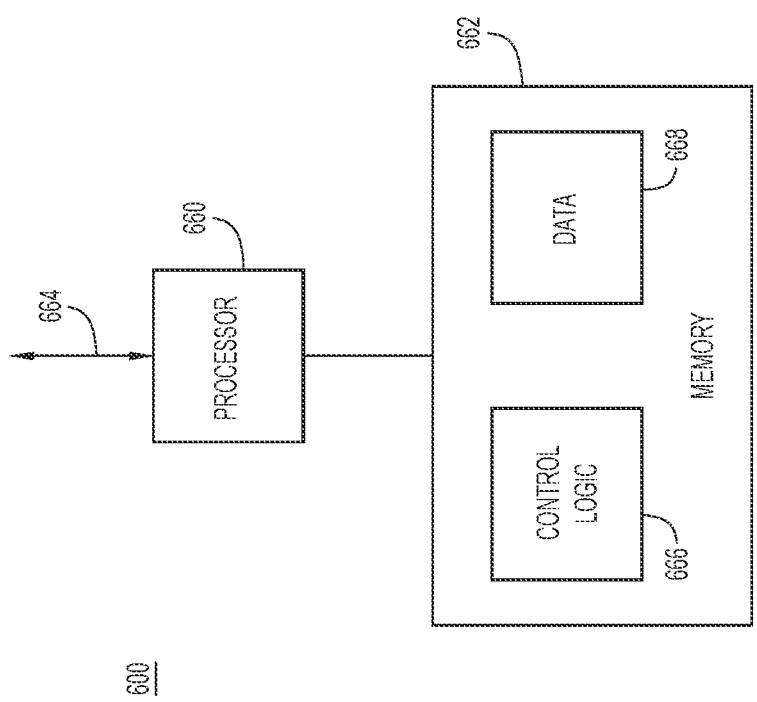
FIG. 6 is a block diagram of an example controller configured to perform operations (e.g., signal processing operations) described herein.

FIG. 6 is a block diagram of an example controller 600 configured to perform operations (e.g., signal processing operations) described herein. Controller 600 includes processor(s) 660 and a memory 662 coupled to one another. The aforementioned components may be implemented in hardware (e.g., a hardware processor), software (e.g., a software processor), or a combination thereof. Processor(s) 660 receive digitized RF energy samples from ADCs in-line with the above-described RF feeds (e.g., ADC 202 for each RF feed) over interfaces 664. Processor(s) 660 communicate with other entities/processes over hardware and/or software interfaces 664, e.g., to provide AOAs/LOBs to a location engine, for example. Memory 662 stores control software 666 (referred as "control logic"), that when executed by the processor(s) 660, causes the processor(s), and more generally, controller 600, to perform the various operations described herein. The processor(s) 660 may be a microprocessor or microcontroller (or multiple instances of such components). The memory 662 may include read only memory (ROM), random access memory (RAM), magnetic disk storage media devices, optical storage media devices, flash memory devices, electrical, optical, or other physically tangible (i.e., non-transitory) memory storage devices. Controller 600 may also be discrete logic embedded within an integrated circuit (IC) device.

Thus, in general, the memory 662 may comprise one or more tangible (non-transitory) computer readable storage media (e.g., memory device(s)) including a first non-transitory computer readable storage medium, a second non-transitory computer readable storage medium, and so on, encoded with software or firmware that comprises computer executable instructions. For example, control software 666 includes logic to implement operations performed by the controller 600. For example, the logic may implement signal processor 112. Thus, control software 666 implements the various methods/operations described herein.

In addition, memory 662 stores data 668 used and produced by control software 666.

In summary, in some aspects, the techniques described herein relate to a method of direction finding (DF) including: by a DF antenna array, receiving a modulated RF signal and converting the modulated RF signal to multiple modulated RF channels; converting the multiple modulated RF channels to multiple channels of in-phase (I) and quadrature (Q) (I/Q) data; by a side-channel antenna, converting the modulated RF signal to a modulated RF side-channel; converting the modulated RF side-channel to a side-channel of I/Q data; demodulating and decoding the side-channel of the I/Q data to yield demodulated data; remodulating the demodulated data to produce remodulated reference I/Q data; correlating the remodulated reference I/Q data against the multiple channels of the I/Q data to produce correlation results for the multiple channels of the I/Q data; and determining an angle-of-arrival of the modulated RF signal to the DF antenna array based on the correlation results.

In some aspects, the techniques described herein relate to a method, wherein: the DF antenna array is omnidirectional; and the side-channel antenna is directional.

In some aspects, the techniques described herein relate to a method, wherein the DF antenna array includes multiple antennas, and the side-channel antenna is not part of the DF antenna array.

In some aspects, the techniques described herein relate to a method, wherein: correlating produces the correlation results without correlating any of the multiple channels of the I/Q data against each other.

In some aspects, the techniques described herein relate to a method, wherein correlating produces correlation peaks having magnitudes and phases, and the method further includes: generating a steering vector populated with the magnitudes and the phases of the correlation peaks, wherein determining includes determining the angle-of-arrival by matching the steering vector to predetermined magnitudes and predetermined phases mapped to predetermined angle-of-arrivals.

In some aspects, the techniques described herein relate to a method, wherein: the modulated RF signal is a digitally modulated RF signal; demodulating includes digitally demodulating the side-channel of the I/Q data; and remodulating including digitally remodulating the demodulated data.

In some aspects, the techniques described herein relate to a method, wherein: decoding includes verifying that the demodulated data is correct using a cyclic redundancy check (CRC).

In some aspects, the techniques described herein relate to a method, wherein: decoding recovers the demodulated data to include an identifier of a transmitter that that transmitted the modulated RF signal.

In some aspects, the techniques described herein relate to a method, wherein: converting the multiple modulated RF channels to the multiple channels of the I/Q data produces the multiple channels of the I/Q data at baseband; and converting the modulated RF side-channel to the side-channel of the I/Q data produces the side-channel of the I/Q data at the baseband.

In some aspects, the techniques described herein relate to a method, further including: on a first platform that includes the DF antenna array, performing converting the modulated RF signal to the multiple modulated RF channels, converting the multiple modulated RF channels to the multiple channels of the I/Q data; on a second platform that includes the side-channel antenna, performing converting the modulated RF signal to the modulated RF side-channel, converting the modulated RF side-channel to the side-channel of the I/Q data, demodulating and decoding the side-channel of the I/Q data, and remodulating the demodulated data to produce the remodulated reference I/Q data; and on the second platform, wireless transmitting the remodulated reference I/Q data to the first platform.

In some aspects, the techniques described herein relate to a system for direction finding (DF) including: a DF antenna array to convert a modulated RF signal received by the DF antenna array to multiple modulated RF channels; a side-channel antenna to convert the modulated RF signal to a modulated RF side-channel; and a signal processor configured to perform: converting the multiple modulated RF channels to multiple channels of in-phase (I) and quadrature (Q) (I/Q) data; converting the modulated RF side-channel to a side-channel of I/Q data; demodulating and decoding the side-channel of the I/Q data to produce demodulated data; remodulating the demodulated data to produce remodulated reference I/Q data; correlating the remodulated reference I/Q data against each of the multiple channels of the I/Q data to produce correlation results for the multiple channels of the I/Q data; and determining an angle-of-arrival of the modulated RF signal to the DF antenna array based on the correlation results.

In some aspects, the techniques described herein relate to a system, wherein the correlation results include correlation peaks having magnitudes and phases, and the signal processor is further configured to perform: generating a steering vector populated with the magnitudes and the phases of the correlation peaks, wherein the signal processor is configured to perform determining the angle-of-arrival by matching the steering vector to predetermined magnitudes and predetermined phases mapped to predetermined angle-of-arrivals.

In some aspects, the techniques described herein relate to a system, wherein: The signal processor is configured to perform correlating to produce the correlation results without correlating any of the multiple channels of the I/Q data against each other.

In some aspects, the techniques described herein relate to a system, wherein: the modulated RF signal is a digitally modulated RF signal; the signal processor is configured to perform demodulating by digitally demodulating the side-channel of the I/Q data; and the signal processor is configured to perform remodulating by digitally remodulating the demodulated data.

In some aspects, the techniques described herein relate to a system, wherein: the signal processor is configured to perform converting the multiple modulated RF channels to the multiple channels of the I/Q data produces the multiple channels of the I/Q data at baseband; and the signal processor is configured to perform converting the modulated RF side-channel to the side-channel of the I/Q data produces the side-channel of the I/Q data at baseband.

In some aspects, the techniques described herein relate to a system, wherein: the signal processor is configured to perform decoding by verifying that the demodulated data is correct using a cyclic redundancy check (CRC).

In some aspects, the techniques described herein relate to a system, wherein: the signal processor is configured to perform decoding by recovering the demodulated data to include an identifier of an emitter that transmitted the modulated RF signal.

In some aspects, the techniques described herein relate to a system, further including: a first platform that includes the DF antenna array and a first signal processor to perform converting the modulated RF signal to the multiple modulated RF channels, converting the multiple modulated RF channels to the multiple channels of the I/Q data; and a second platform that includes the side-channel antenna and a second signal processor to perform converting the modulated RF signal to the modulated RF side-channel, converting the modulated RF side-channel to the side-channel of the I/Q data, demodulating and decoding the side-channel of the I/Q data, and remodulating the demodulated data to produce the remodulated reference I/Q data, wherein the second platform further includes a wireless transmitter configured to transmit the remodulated reference I/Q data to the first platform.

In some aspects, the techniques described herein relate to a non-transitory computer readable medium encoded with instructions that, when executed by a processor of a direction finding (DF) system that includes a DF antenna array to receive a modulated RF signal and convert the modulated RF signal to multiple modulated RF channels, and a side-channel antenna to convert the modulated RF signal to a modulated RF side-channel, cause the processor to perform: converting the multiple modulated RF channels to multiple channels of in-phase (I) and quadrature (Q) (I/Q) data; converting the modulated RF side-channel to a side-channel of I/Q data; demodulating and decoding the side-channel of the I/Q data to yield demodulated data; remodulating the demodulated data to produce remodulated reference I/Q data; correlating the remodulated reference I/Q data against the multiple channels of the I/Q data to produce correlation results for the multiple channels of the I/Q data; and determining an angle-of-arrival of the modulated RF signal to the DF antenna array based on the correlation results.

In some aspects, the techniques described herein relate to a non-transitory computer readable medium, wherein: the DF antenna array is omnidirectional; and the side-channel antenna is directional.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of direction finding (DF) comprising:
by a DF antenna array, receiving a modulated RF signal and converting the modulated RF signal to multiple modulated RF channels;
converting the multiple modulated RF channels to multiple channels of in-phase (I) and quadrature (Q) (I/Q) data;
by a side-channel antenna, converting the modulated RF signal to a modulated RF side-channel;
converting the modulated RF side-channel to a side-channel of I/Q data;
demodulating and decoding the side-channel of the I/Q data to yield demodulated data;
remodulating the demodulated data to produce remodulated reference I/Q data;
correlating the remodulated reference I/Q data against the multiple channels of the I/Q data to produce correlation results for the multiple channels of the I/Q data; and
determining an angle-of-arrival of the modulated RF signal to the DF antenna array based on the correlation results.

2. The method of claim 1, wherein:
the DF antenna array is omnidirectional; and
the side-channel antenna is directional.

3. The method of claim 1, wherein the DF antenna array includes multiple antennas, and the side-channel antenna is not part of the DF antenna array.

4. The method of claim 1, wherein:
correlating produces the correlation results without correlating any of the multiple channels of the I/Q data against each other.

5. The method of claim 1, wherein correlating produces correlation peaks having magnitudes and phases, and the method further comprises:
generating a steering vector populated with the magnitudes and the phases of the correlation peaks,
wherein determining includes determining the angle-of-arrival by matching the steering vector to predetermined magnitudes and predetermined phases mapped to predetermined angle-of-arrivals.

6. The method of claim 1, wherein:
the modulated RF signal is a digitally modulated RF signal;
demodulating includes digitally demodulating the side-channel of the I/Q data; and
remodulating including digitally remodulating the demodulated data.

7. The method of claim 1, wherein:
decoding includes verifying that the demodulated data is correct using a cyclic redundancy check (CRC).

8. The method of claim 1, wherein:
decoding recovers the demodulated data to include an identifier of a transmitter that that transmitted the modulated RF signal.

9. The method of claim 1, wherein:
converting the multiple modulated RF channels to the multiple channels of the I/Q data produces the multiple channels of the I/Q data at baseband; and
converting the modulated RF side-channel to the side-channel of the I/Q data produces the side-channel of the I/Q data at the baseband.

10. The method of claim 1, further comprising:
on a first platform that includes the DF antenna array, performing converting the modulated RF signal to the multiple modulated RF channels, converting the multiple modulated RF channels to the multiple channels of the I/Q data;
on a second platform that includes the side-channel antenna, performing converting the modulated RF signal to the modulated RF side-channel, converting the modulated RF side-channel to the side-channel of the I/Q data, demodulating and decoding the side-channel of the I/Q data, and remodulating the demodulated data to produce the remodulated reference I/Q data; and
on the second platform, wireless transmitting the remodulated reference I/Q data to the first platform.

11. A system for direction finding (DF) comprising:
a DF antenna array to convert a modulated RF signal received by the DF antenna array to multiple modulated RF channels;
a side-channel antenna to convert the modulated RF signal to a modulated RF side-channel; and
a signal processor configured to perform:
converting the multiple modulated RF channels to multiple channels of in-phase (I) and quadrature (Q) (I/Q) data;
converting the modulated RF side-channel to a side-channel of I/Q data;
demodulating and decoding the side-channel of the I/Q data to produce demodulated data;
remodulating the demodulated data to produce remodulated reference I/Q data;
correlating the remodulated reference I/Q data against each of the multiple channels of the I/Q data to produce correlation results for the multiple channels of the I/Q data; and
determining an angle-of-arrival of the modulated RF signal to the DF antenna array based on the correlation results.

12. The system of claim 11, wherein the correlation results include correlation peaks having magnitudes and phases, and the signal processor is further configured to perform:
generating a steering vector populated with the magnitudes and the phases of the correlation peaks,
wherein the signal processor is configured to perform determining the angle-of-arrival by matching the steering vector to predetermined magnitudes and predetermined phases mapped to predetermined angle-of-arrivals.

13. The system of claim 11, wherein:
The signal processor is configured to perform correlating to produce the correlation results without correlating any of the multiple channels of the I/Q data against each other.

14. The system of claim 11, wherein:
the modulated RF signal is a digitally modulated RF signal;
the signal processor is configured to perform demodulating by digitally demodulating the side-channel of the I/Q data; and
the signal processor is configured to perform remodulating by digitally remodulating the demodulated data.

15. The system of claim 11, wherein:
the signal processor is configured to perform converting the multiple modulated RF channels to the multiple channels of the I/Q data produces the multiple channels of the I/Q data at baseband; and
the signal processor is configured to perform converting the modulated RF side-channel to the side-channel of the I/Q data produces the side-channel of the I/Q data at baseband.

16. The system of claim 11, wherein:
the signal processor is configured to perform decoding by verifying that the demodulated data is correct using a cyclic redundancy check (CRC).

17. The system of claim 11, wherein:
the signal processor is configured to perform decoding by recovering the demodulated data to include an identifier of an emitter that transmitted the modulated RF signal.

18. The system of claim 11, further comprising:
a first platform that includes the DF antenna array and a first signal processor to perform converting the modulated RF signal to the multiple modulated RF channels, converting the multiple modulated RF channels to the multiple channels of the I/Q data; and
a second platform that includes the side-channel antenna and a second signal processor to perform converting the modulated RF signal to the modulated RF side-channel, converting the modulated RF side-channel to the side-channel of the I/Q data, demodulating and decoding the side-channel of the I/Q data, and remodulating the demodulated data to produce the remodulated reference I/Q data,
wherein the second platform further comprises a wireless transmitter configured to transmit the remodulated reference I/Q data to the first platform.

19. A non-transitory computer readable medium encoded with instructions that, when executed by a processor of a direction finding (DF) system that includes a DF antenna array to receive a modulated RF signal and convert the modulated RF signal to multiple modulated RF channels, and a side-channel antenna to convert the modulated RF signal to a modulated RF side-channel, cause the processor to perform:
  converting the multiple modulated RF channels to multiple channels of in-phase (I) and quadrature (Q) (I/Q) data;
  converting the modulated RF side-channel to a side-channel of I/Q data;
  demodulating and decoding the side-channel of the I/Q data to yield demodulated data;
  remodulating the demodulated data to produce remodulated reference I/Q data;
  correlating the remodulated reference I/Q data against the multiple channels of the I/Q data to produce correlation results for the multiple channels of the I/Q data; and
  determining an angle-of-arrival of the modulated RF signal to the DF antenna array based on the correlation results.

20. The non-transitory computer readable medium of claim 19, wherein:
the DF antenna array is omnidirectional; and
the side-channel antenna is directional.

* * * * *